Jan. 12, 1937. F. BULLOCK 2,067,875
AUTOMATIC CONTROL FOR HUMIDIFIERS
Filed Nov. 22, 1934

INVENTOR
Frank Bullock
BY Arthur H Watson
ATTORNEY

Patented Jan. 12, 1937

2,067,875

UNITED STATES PATENT OFFICE 2,067,875

AUTOMATIC CONTROL FOR HUMIDIFIERS

Frank Bullock, Lake Geneva, Wis., assignor to Middlebury Electric Clock Corporation, a corporation of Illinois Application November 22, 1934, Serial No. 754,383

1 Claim. (Cl. 200—52)

This invention relates to improvements in automatic control for humidifiers and more particularly to an automatically operated control switch for connecting and disconnecting an electrically operated humidifier upon a decrease or increase in the proper degree of moisture in the air for any given temperature.

Various types of air humidifiers have been offered for sale from time to time wherein small electric motors are provided to drive a fan and water vaporizing impellor. Such devices are intended to be connected with the house lighting circuit and a manual control switch is usually provided so that the user may operate the humidifier at will whenever it is found that the surrounding air has become too dry. This procedure, however, necessitates reference to a thermometer and hygrostat and bothersome manual effort.

It is, therefore, an object of my invention to provide an improved automatic control for electrically operated humidifiers which will automatically turn on and off the humidifier as the relative humidity of the air changes thereby to maintain at all times a proper relative humidity for the particular room temperature.

Another object is to provide an automatic control for humidifiers, as described, incorporating mechanism sensitive to the temperature changes in the air for compensating the functioning of the humidity responsive switch control mechanism thereby to cause the control switch to remain open under temperature and humidity proportions which if plotted upon a graph, one proportion against the other, would result in an irregular curve. This feature of my invention I consider of great importance since at higher than normal temperatures humidity must be increased above that prescribed as within the ideal comfort zone in order to prevent the drying of furniture and similar articles in the room.

Other objects, the advantages, and uses of my invention will be apparent after reading the following specification and claim and after consideration of the drawing forming a part of the specification, wherein:

Figures 1, 2:
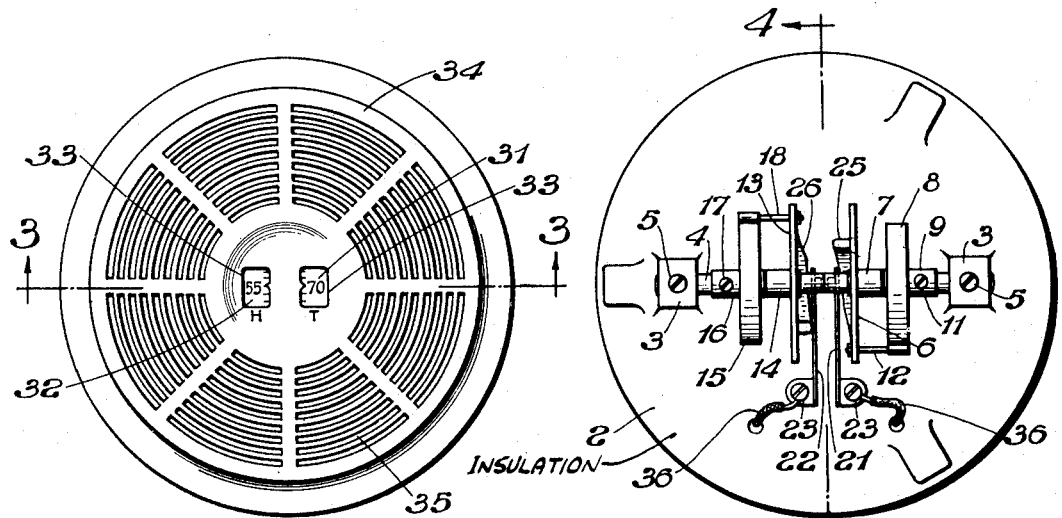
Fig. 1 is a top plan view of an automatic humidifier control device constructed in accordance with my invention.
Fig. 2 is a view of the device of Fig. 1 with the cover and dials removed.
Figure 3:
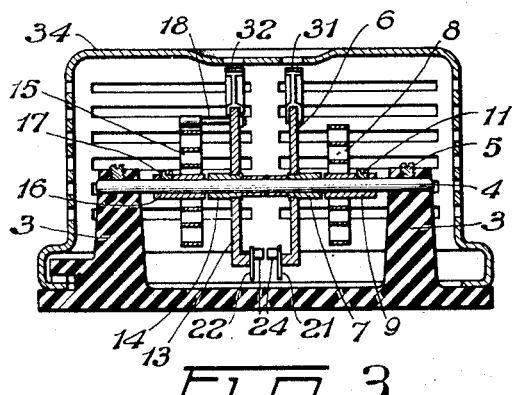
Fig. 3 is a sectional view along the line 3—3 of Fig. 1.
Figure 4:
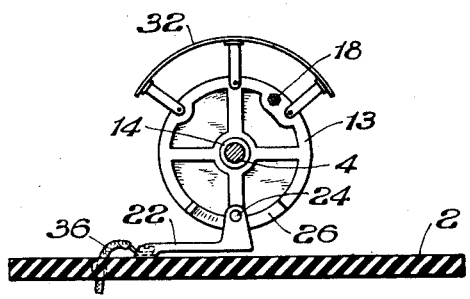
Fig. 4 is a sectional view along the line 4—4 of Fig. 2.

With reference to the drawing the control device may comprise a base member 2 of moulded composition, having a pair of spaced apart upstanding supports 3 formed therein. A steel shaft 4 extending between the supports 3 and fixed thereto by set screws 5 serves as a mounting for the temperature and humidity responsive elements of the device.

The temperature responsive element may comprise a disc 6 of moulded composition rotatably mounted upon the shaft 4 through the medium of a sleeve 7 extending centrally through the disc and a spiral of bimetal 8, the inner end of which is fixed to a sleeve 9 secured to the shaft 4 by a set screw 11 and the outer end of which is secured to the disc 6 through the medium of a pin 12.

The humidity responsive element may be of similar construction, including a disc 13, sleeve 14, a spiral of hygroscopic material 15 secured to a sleeve 16 at its inner end, a sleeve set screw 17 and a pin 18 rigidly connecting the outer end of the spiral with the disc 13. The spiral of hydroscopic material may be constructed of a thin brass strip having cemented to one side thereof a strip of paper subject to shrinkage and stretching in accordance to decreases and increases in relative humidity respectively or, if desired, a strip of cat-gut may be substituted for the paper.

Resilient metal contact fingers 21 and 22 are located between the opposed faces of the discs 6 and 13 in spaced apart parallel relationship, as shown in Fig. 2 and are secured, at their ends, to the base 2 by screws 23. Each of the fingers has a contact member 24 of tungsten or other suitable contact metal at its outer end, which contact members are normally held apart from one another by the tendency of the contact fingers to lie apart from one another.

Figure 5:
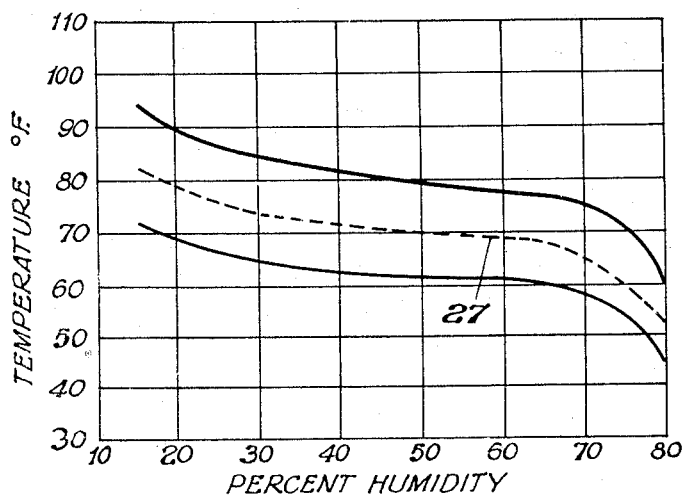
Fig. 5 is a chart representing a temperature and humidity curve such as that which may be maintained through the use of my improved control device.

Cams 25 and 26 are formed on the opposed faces of the discs 6 and 13 respectively and each has a form determined by the dotted curve 27 plotted in the chart of Fig. 5 representing proper or desirable relationship between temperature and humidity of air for human occupancy. The cams are so located upon the discs 6 and 13 as to register with the contact fingers 21 and 22 respectively and to cooperate with one another and with the contact fingers to cause the contact members 24 to contact with one another under all temperature and relative humidity conditions represented in the chart of Fig. 5 which lie beneath the dotted curve 27. Since the curve 27 is other than a straight line, the surfaces of the cams 25 and 26 will be irregular in contour as best illustrated in Fig. 2.

In order that a person may determine the temperature and relative humidity at a glance for the surrounding air dials 31 and 32 calibrated in temperature in degrees Fahrenheit and percent humidity are secured to the discs 6 and 13 and may be viewed through windows 33 in the cover 34 of the device, I prefer to form the cover 34 with a plurality of openings 35 therethrough for admitting air to the elements 8 and 15.

In operation my improved automatic control device is placed in any position within a room where control may best be carried out, such as upon the wall, or, if desired, upon the humidifier device. The binder screws 23 may be connected in series, as by wires 36, with the electrical control circuit of the electrical humidifier so that when the contacts 24 touch one another the humidifier will operate.

It is to be understood that the above described embodiments of my invention are for the purpose of illustration only and various changes may be made therein without departing from the spirit and scope of the invention.

I claim:

A control device of the character described comprising, a normally open electric switch including a pair of cooperating contact members, a thermostatic element, a hygrostatic element, and means operable by said elements conjointly for operating said switch when the relative humidity of the air surrounding said elements falls below a predetermined amount relative to the temperature of the air, said means including cam members one associated with each of said elements, each of said cams being arranged independently to move one of said contact members in response to operation of its said associated element.

FRANK BULLOCK.